United States Patent
Seo

(10) Patent No.: US 6,778,481 B2
(45) Date of Patent: Aug. 17, 2004

(54) METHOD OF CONTROLLING DISK WRITING OPERATION BASED ON BATTERY REMAINING CAPACITY

(75) Inventor: An Seong Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/994,648

(22) Filed: Nov. 28, 2001

(65) Prior Publication Data

US 2002/0064112 A1 May 30, 2002

(30) Foreign Application Priority Data

Nov. 28, 2000 (KR) .......................................... 2000-71379
Aug. 10, 2001 (KR) .......................................... 2001-48359

(51) Int. Cl.[7] .................................................. G11B 9/00
(52) U.S. Cl. ................................... 369/53.18; 369/59.25
(58) Field of Search .......................... 369/53.18, 59.25, 369/44.31; 395/750.01; 710/129; 711/4

(56) References Cited

U.S. PATENT DOCUMENTS

| | | | | |
|---|---|---|---|---|
| 5,610,723 A | * | 3/1997 | Yamagishi ..................... 386/75 |
| 5,673,070 A | * | 9/1997 | Nakanishi et al. ............. 347/19 |
| 5,818,807 A | * | 10/1998 | Kuroda et al. ............... 369/116 |
| 5,835,780 A | * | 11/1998 | Osaki et al. ........... 395/750.01 |
| 5,854,875 A | * | 12/1998 | Yamagishi ................... 386/120 |
| 6,232,747 B1 | * | 5/2001 | Takahashi et al. ........... 320/132 |
| 6,253,023 B1 | * | 6/2001 | Fukushima et al. ......... 386/117 |
| 6,263,152 B1 | * | 7/2001 | Hisatomi et al. ............. 386/70 |
| 6,295,569 B1 | * | 9/2001 | Shimura et al. ............. 710/129 |

* cited by examiner

*Primary Examiner*—Gautam R. Patel
(74) *Attorney, Agent, or Firm*—Birch, Stewart, Kolasch & Birch, LLP

(57) ABSTRACT

A method of controlling a disk writing operation based on a currently remaining electric power capacity of a battery is disclosed. This method is applicable to a portable device such as an electronic notebook or a disk drive using a battery as a power source. This method detects a remaining electric power capacity of the battery, compares the detected remaining electric power capacity with a reference capacity required for completing a writing operation, and then, if the detected remaining capacity is lower than the reference capacity, stops the current writing operation and conducts a data writing closing operation for properly closing or terminating the current writing operation. As a result, the present invention prevents effective disk damages caused from an abnormal writing termination due to the complete discharge of the battery.

9 Claims, 5 Drawing Sheets

METHOD OF CONTROLLING DISK WRITING OPERATION BASED ON BATTERY REMAINING CAPACITY

RELATED APPLICATION

The present application claims the benefit of Korean Patent Application No. 00-71379 filed on Nov. 28, 2000, and Korean Patent Application No. 01-48359 filed on Aug. 10, 2001, each of which is herein fully incorporated by reference.

BACKGROUND OF THE INVENTION

1. Field of the Invention

The present invention relates to a method of controlling a disk writing operation based on a remaining battery capacity. This method is applicable to a portable device such as a notebook or a disk drive which uses a battery as a power source.

2. Description of the Related Art

The dimensions and weight of electronic notebooks ("notebooks") are getting smaller and lighter. As a result, they are widely used at present.

Generally, an electric power is supplied to a notebook from a battery and/or an AC power line. However, because the battery capacity of the notebook is limited, the notebook cannot be used for more than a few hours. In addition, a disk drive included in the notebook is driven at a high speed and thereby requires a high power consumption. This reduces significantly the power supplying time of the battery equipped in the notebook.

Furthermore, because the disk drive in the notebook is driven at a fixed maximum high speed whenever it is activated, a driving time of the disk drive to reach the fixed maximum speed is relatively long and a large amount of driving current is needed to reach and maintain the maximum driving speed. These factors prevent extension of battery supplying time for the notebooks or the like.

To resolve such problems, a new Patent Application No. 99-41946 was filed in Korea Industrial Property Office on Sep. 30, 1999 on behalf of LG Electronics, Inc. with an entitlement of "method and apparatus of driving a disk based on battery remaining capacity". The invention described in that Korean Patent Application is to extend the power supplying time of a battery by adjusting the speed of a disk inserted in a disk drive based on the battery's remaining electric power capacity.

However, in the method discussed in Korean Patent Application No. 99-41946, the battery may be completely discharged while the disk in the disk drive is being driven at an adjusted, lower speed if the remaining electric power capacity of the battery is low. If the battery is completely discharged while the inserted disk is being written, then the writing operation is abnormally terminated. At the abnormal termination of the writing operation, information on a writing-terminated track is not written in a Program Memory Area (PMA) reserved on the disk, so that the last recording position of the disk is not preserved. This makes it difficult to append data to the writing-terminated disk. Further, because the writing-terminated disk does not contain any information regarding the status of the writing-terminated track, a session including the writing-terminated track cannot be closed. This creates a problem in reading the disk because the writing-terminated disk containing an opened session cannot be read by a reproduction-only disk drive such as a CD-ROM drive.

SUMMARY OF THE INVENTION

Accordingly, it is an object of the present invention to provide a method of controlling a disk writing operation based on a remaining battery capacity (i.e., remaining electric power capacity of a battery), which ensures the normal completion of the disk writing operation at all times. The method determines whether or not to end the disk writing operation in advance after checking the remaining electric power capacity of a battery equipped in a notebook, a portable disk drive or the like, while recording data to a writable disk. The method also calculates an expected suppliable (use) time of the battery before recording data.

A method of controlling a disk writing operation based on a remaining battery capacity in accordance with an embodiment of the present invention, detects a currently remaining battery capacity, compares the detected remaining battery capacity with a reference capacity required for conducting the normal completion of a writing operation, and conducts data writing or completion of the writing operation based on the comparison results.

A method of controlling a disk writing operation based on a remaining battery capacity in accordance with another embodiment of the present invention, estimates a suppliable capacity of a battery (i.e., remaining battery capacity), determines whether it is possible to record an amount of data requested to be written to a recording medium in view of the estimated suppliable capacity of the battery, and controls a disk writing operation according to the determination results.

The present invention will become more fully understood from the detailed description given hereinbelow and the accompanying drawings which are given by way of illustration only, and thus are not limitative of the present invention and wherein:

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENTS

In order that the invention may be fully understood, a preferred embodiment thereof will now be described with reference to the accompanying drawings.

Figure 1:
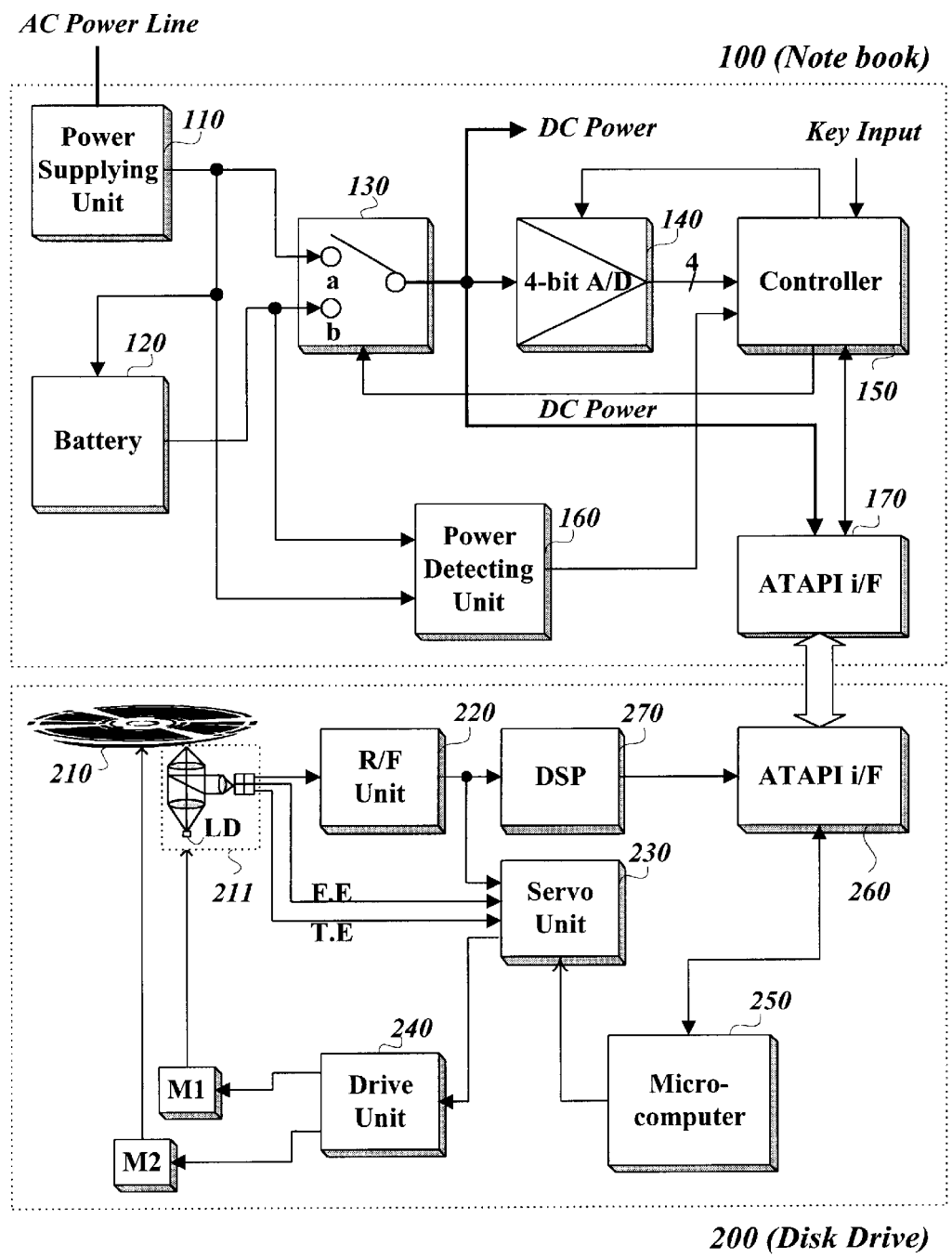
FIG. 1 shows a block diagram of an electronic notebook and a disk drive coupled with the notebook through an ATAPI interface according to an embodiment of the present invention.

FIG. 1 shows a block diagram of an electronic notebook 100 and a disk drive 200 to which a method of controlling a disk writing operation based on a remaining battery capacity in accordance with the present invention is applicable. The disk drive 200 is operatively connected to the notebook 100 through an ATAPI interface. In some embodiments, the disk drive 200 may be integrally disposed in the notebook 100, separable from the notebook 100, or remotely disposed from the notebook 100.

The notebook 100 as shown in FIG. 1 comprises a power supplying unit 110 for rectifying AC power fed by an AC power line to DC power and supplying the rectified DC power to all elements of the notebook 100 and the disk drive 200; a battery 120 for charging its internal cells with electric energy of the DC power and/or discharging electric energy as needed; a power switch 130 for selecting one of available power sources; an A/D converter 140 for digitizing an analog input signal; a power detecting unit 160 for detecting whether or not power is supplied from an external AC power line; a controller 150 for detecting, based on the digitized data from the A/D converter 140, the charged level of the battery 120; and an ATAPI interface 170 for communicating data with the disk drive 200 in accordance with known ATAPI protocols.

The disk drive 200 as shown in FIG. 1 comprises an optical pickup 211 for reading recorded data from an inserted disk 210 or other recording medium; a driving unit 240 for driving motors M1 and M2 to move and rotate the pickup 211 and the disk 210, respectively; an R/F unit 220 for equalizing and shaping RF signals detected by the pickup 211 to produce binary signals; a digital signal processing (DSP) unit 270 for processing the binary signals from the R/F unit 220 to restore original digital data; a servo unit 230 for controlling the driving unit 240 and an actuator of the pickup 211; an ATAPI interface 260; and a microcomputer 250 for determining a disk driving speed by interpreting command packets or signals received through the ATAPI interface 260 and supervising the driving unit 240 to rotate the inserted disk 210 at the determined disk driving speed.

Figure 2:
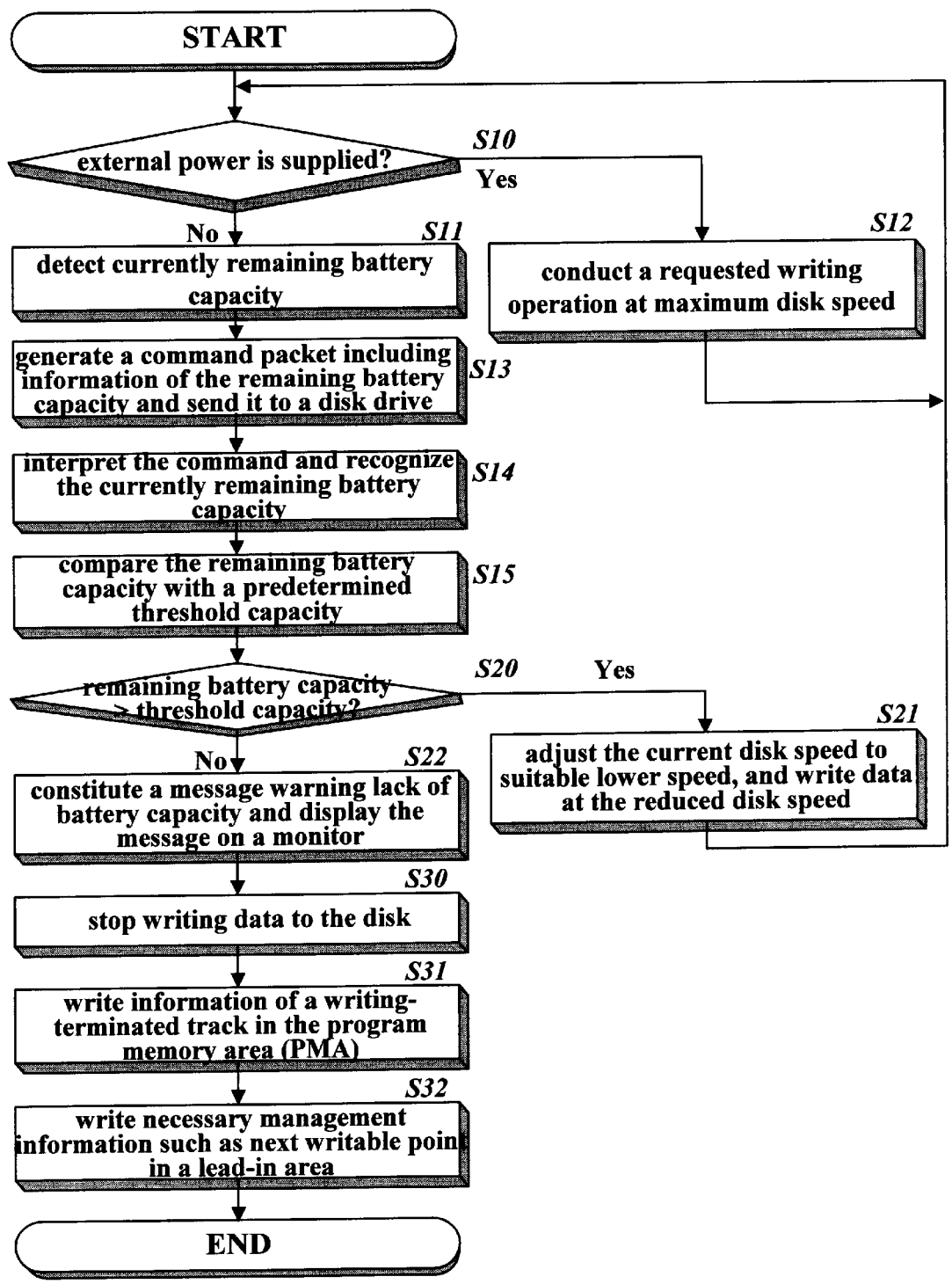
FIG. 2 is a flow diagram embodying a method of controlling a disk writing operation applicable to the structure of FIG. 1 according to an embodiment of the present invention.

FIG. 2 is a flow diagram embodying a method of controlling a disk writing operation according to an embodiment of the present invention. The processing steps of this method are explained in detail below as they are applied in the disk drive equipped notebook configured as shown in FIG. 1, but are equally applicable to other devices and/or systems.

Referring to FIGS. 1 and 2, electric energy or power supplied from an external AC power source is applied to the power supplying unit 110, which rectifies the AC power to DC power. The battery 120 charges its internal cells with the electric energy supplied from the DC power.

While the battery 120 is being charged, the controller 150 checks whether or not an external power (e.g., from an AC power line) is supplied based on an output value of the power detecting unit 160 (Step S10). If the output value indicates that an external power is being supplied, the controller 150 commands the switch 130 to select its 'a' terminal so that the DC power supplied from the power supplying unit 100 can be supplied to all the elements of the notebook 100 and the disk drive 200.

If it is determined at Step S10 that the external AC power is being supplied to the power supplying unit 110, and data writing to the disk 210 is requested (e.g., from a user), then the microcomputer 250 of the disk drive 200 commands the driving unit 240 to apply a driving voltage corresponding to a predetermined maximum disk speed to the spindle motor M2. After the disk rotation speed has reached the predetermined maximum speed, the microcomputer 250 conducts the requested writing operation on the disk 210 rotating at the predetermined maximum disk speed (Step S12).

However, if it is determined at Step S10 that an external AC power is not connected to the notebook 100 so that the DC power is not being supplied from the power supplying unit 110, then the battery 120 is used to supply the necessary electric power. In this case, the controller 150 recognizes from the output value of the power detecting unit 160 that there is no external AC power, and commands the switch 130 to select its 'b' terminal instead of its 'a' terminal. Due to the 'b' terminal selection of the switch 130, the electric energy charged in the battery 120 is supplied to all the elements of the notebook 100 and the disk drive 200.

While the battery 120 supplies the necessary electric power, the controller 150 checks a digitized value from the A/C converter 140 to determine how much electric power currently remains in the battery 120 (Step S11). That is, the digitized value represents an amount of the currently remaining electric power capacity of the battery 120 (i.e., the remaining battery capacity). For example, the digitized value of '1000b' may mean that the currently remaining battery capacity is at one-half (50%) of its full battery capacity. Obviously, other values can be used to represent the currently remaining battery capacity. The relation between the digitized value and the remaining battery capacity depends upon a DC offset biased to the A/D converter 140.

The controller 150 generates a command packet including information about the remaining electric power capacity of the battery 120 in accordance with ATAPI protocols, and then sends the command packet to the ATAPI interface 260 through the local ATAPI interface 170 (Step S13). The ATAPI interface 260 of the disk drive 200 delivers the received command packet to the microcomputer 250 which in turn recognizes the currently remaining electric power capacity of the battery 120 in the notebook 100 by interpreting the command packet (Step S14).

Then, the microcomputer 250 compares the currently remaining electric power capacity of the battery 120 with a predetermined threshold capacity (Step S15). The predetermined threshold capacity is predetermined to be at a level at which a completion of a writing operation can be guaranteed. The threshold capacity may be, e.g., 6.25% of the full electric power capacity of the battery 120. The microcomputer 250 controls the current writing operation based on the comparison results which is discussed below in more detail. Generally, the predetermined threshold capacity is determined to be not less than the minimum energy level required for completing a data writing operation from the middle time frame of the writing operation.

If the comparison result at Step S20 indicates that the currently remaining electric power capacity of the battery 120 is larger than the predetermined threshold capacity, then the microcomputer 250 adjusts the current disk speed to a suitable lower speed, as needed, to extend the writing time, and continues with the current data writing operation at the reduced disk speed (Step S21) to properly complete the current data writing operation. This disk speed reduction is preferably conducted if the currently remaining electric power capacity of the battery 120 is lower than one-half of the full electric power capacity of the battery 120, but can be conducted under different conditions.

While data is being written at the adjusted speed in Step S21, the microcomputer 250 continues to check the currently remaining electric power capacity of the battery 120 by continuously evaluating data sent from the controller 150. While checking this battery capacity indicating data, if the remaining electric power capacity of the battery 120 falls below the predetermined threshold capacity, then Step S22 is performed. In Step S22, since the predetermined threshold capacity is also stored in the controller 150, the controller 150 generates a warning message, e.g., "You should complete your current writing operation because of low battery!" and displays the warning message on a display device such as a monitor before delivering information about the currently remaining electric power capacity of the battery 120 to the disk drive 200. If a user acknowledges the warning message, a certain time has elapsed, or some other condition has been satisfied, then the controller 150 directs the remaining electric power of the battery 120 to the microcomputer 250 of the disk drive 200, so that the writing operation can be properly closed or terminated by the microcomputer 250 through Steps S30–S32.

In Steps S30 to S32, the microcomputer 250 starts to properly close or terminate the current writing operation regardless of whether or not all of the data are written. Particularly, to accomplish this, the microcomputer 250 first stops writing data to the disk 210 (Step S30), and then writes information about the writing-terminated track of the disk 210 into the Program Memory Area (PMA) of the disk 210 for storing therein temporary management information (Step S31). Preferably, the microcomputer 250 closes a session including the writing-terminated track to make the disk 210 accessible even during an operation of a reproduction-only disk drive. In the session-closing operation, the microcomputer 250 writes program area ending marks, e.g., 2 Hz pulse signal marks, behind the writing-terminated track. The 2 Hz pulse written zone forms a lead-out area on the disk 210. The microcomputer 250 also writes management information identifying the next writable point, which is the ending point of the writing-terminated track, onto a lead-in area of the disk 210 reserved at the fore part of the session including the writing-terminated track (Step S32). This completes the process of properly closing or terminating the current data writing operation in view of the low remaining battery capacity.

The method of controlling a disk writing operation based on the remaining battery capacity in accordance with the present invention as discussed above is applicable to an independent portable disk drive in addition to the disk drive-equipped notebook discussed above. In an independent portable disk drive, generally, the ATAPI interfaces 170 and 260 are removed and the controller 150 and the microcomputer 250 are integrated into a single unit. An independent portable disk drive may also have a small LCD panel or other known displaying means.

Figure 3:
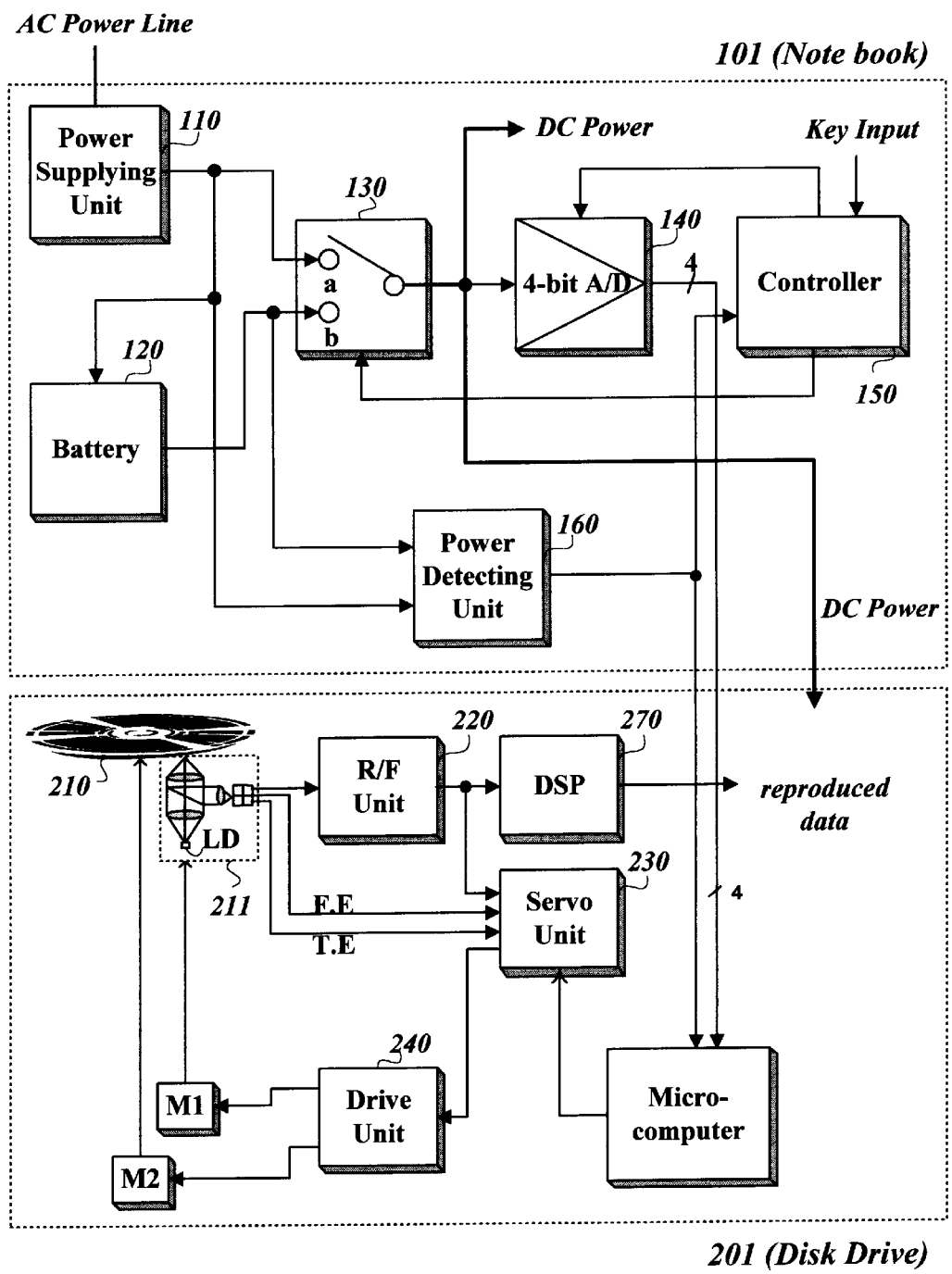
FIG. 3 shows a block diagram of a different electronic notebook equipped with a disk drive to which a method of controlling a disk writing operation based on a remaining battery capacity in accordance with of the present invention is applicable.

FIG. 3 shows a block diagram of a notebook 101 equipped with a disk drive 201 to which a method of controlling a disk writing operation based on the remaining battery capacity is applicable in accordance with another embodiment of the present invention.

The configuration and operation of the structure shown in FIG. 3 are identical to the configuration and operation of the structure shown in FIG. 1, except that, in the structure of FIG. 3, information about the currently remaining battery capacity and which power source is being supplied is delivered directly to the disk drive 201 through additional signal lines, instead of using the ATAPI interfaces 170 and 260 as in the notebook 100 and the disk drive 200 of FIG. 1.

A method of controlling a disk writing operation conducted in the disk drive equipped notebook 101 depicted in FIG. 3 is as follows according to an embodiment of the present invention. The output value of the power detecting unit 160 and the digitized value of the A/D converter 140 are delivered directly to the microcomputer 250 of the disk drive 201 via signal lines or the like. Then, the microcomputer 250 determines from the output value of the power detecting unit 160 whether or not an external power (e.g., from an AC power line) is being used. If the external power is being used, the microcomputer 250 drives the disk 210 to rotate at a predetermined maximum speed and writes data to the disk 210. However, if the external power is not being used, then the microcomputer 250 recognizes the currently remaining electric power capacity of the battery 120 in proportion to the digitized value of the A/D converter 140, compares the remaining electric power capacity of the battery 120 with a predetermined threshold capacity, and conducts an adjustment of the disk rotation speed and/or properly closes the current writing operation based on the comparison results, as explained above in connection with FIG. 2.

Figure 4:
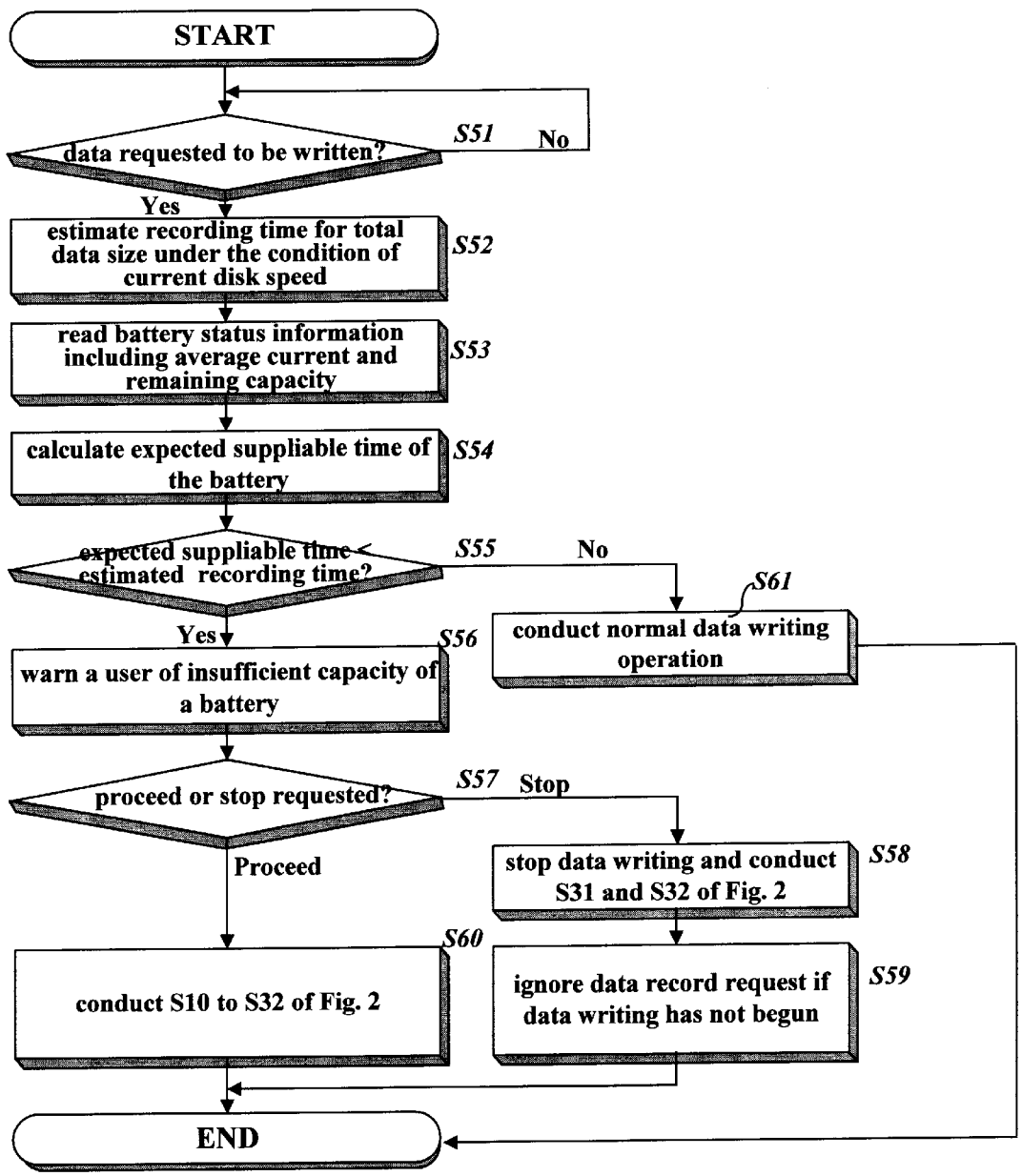
FIG. 4 is a flow diagram embodying a method of controlling a disk writing operation according to another embodiment of the present invention.
Figure 5:
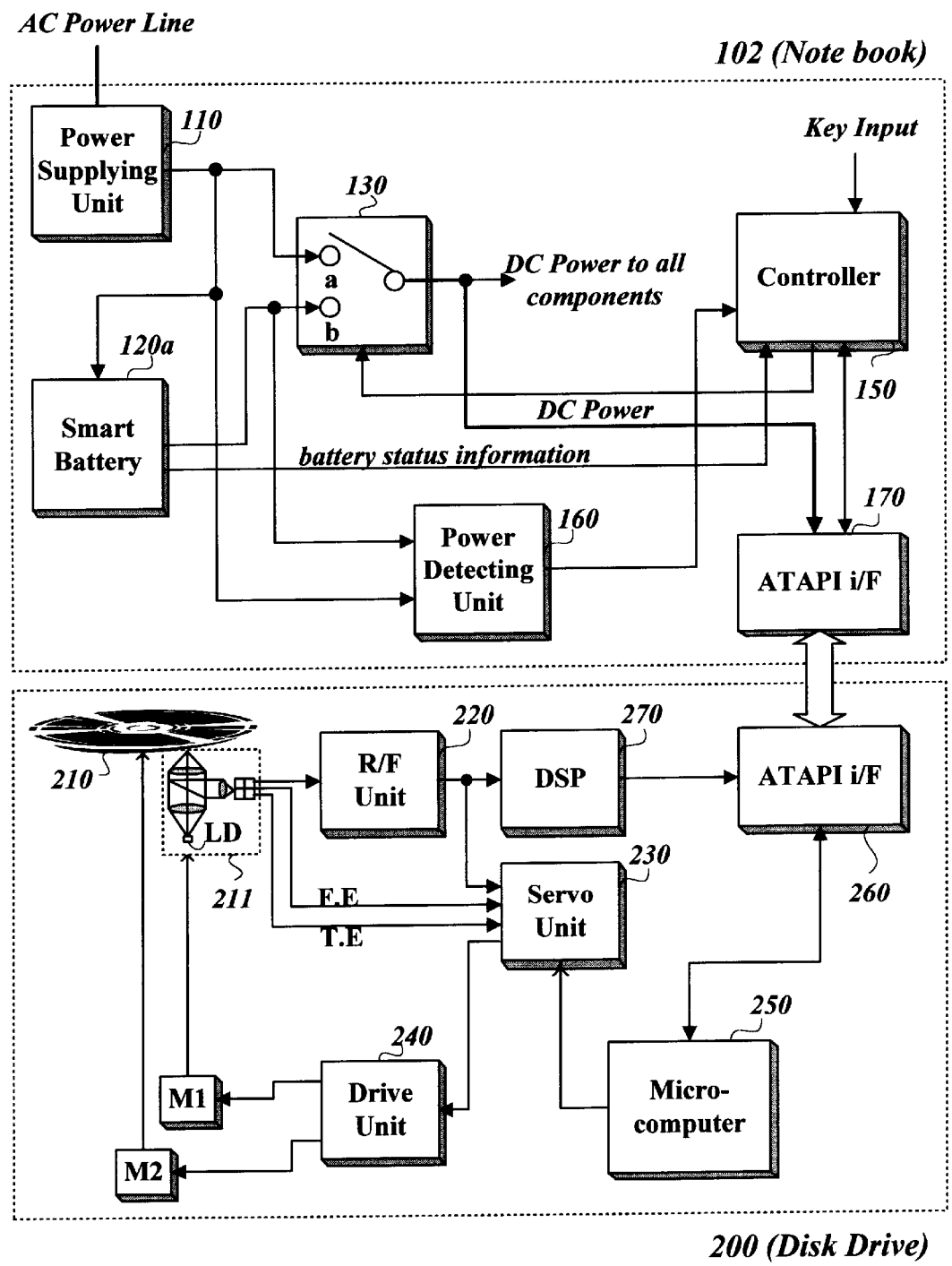
FIG. 5 shows a block diagram of another electronic notebook equipped with a disk drive to which the method of FIG. 4 is applicable.

FIG. 4 is a flow diagram embodying a method of controlling a disk writing operation according to another embodiment of the present invention. This method depicted in FIG. 4 is applicable to a notebook 102 including a smart battery 120a and the disk drive 200 depicted in FIG. 5. The notebook 102 of FIG. 5 is identical to the notebook 100 of FIG. 1, except for the structure and operation of the smart battery 120a and the removal of the A/D converter 140. The smart battery 120a directly provides various information on electric power charged in its internal battery cells to the controller 150 through a connected bus or some other means.

The processing steps shown in FIG. 4 are implemented in the smart battery equipped notebook 102 as shown in FIG. 5 and will be explained below in detail.

Referring to FIGS. 4 and 5, if data writing is requested to the controller 150 of the notebook 102 from a user or some other means (Step S51), the controller 150 determines the size of the data to be written and estimates a total recording time needed to record the data at the current disk speed of the disk drive 200 (Step S52). In addition, the controller 150 receives information on 'average electric current' in a current unit such as miliamperes (mA) and the remaining electric power capacity of the battery 120a in [current×time] units, e.g., "mA×h" unit where h represents time. Both pieces of information are provided by the smart battery 120a periodically, e.g., every 15 seconds, as known in the art. Here, the "average electric current" represents an average amount of current used by a writing operation or other operation. The controller 150 then calculates an expected suppliable time (use time) of the smart battery 120a by dividing the remaining electric power capacity of the smart battery 120a by the average electric current (Step S54).

In one embodiment, to determine the expected suppliable time of the battery more accurately, before the calculation, the controller 150 drives the inserted disk 210 to rotate at a predetermined maximum speed and writes some test data to the disk 210 for a certain time duration. Due to this test writing operation, the electric current supplied from the smart battery 120a is increased, and the electric current required for rotating the disk 210 is reflected in the 'average electric current' information provided by the smart battery 120a. Therefore, the expected suppliable time obtained by dividing the remaining battery capacity by the 'average electric current' becomes much more exact.

Then, the controller 150 compares the expected suppliable time with the estimated total recording time (Step S55), and warns the user of insufficient electric power capacity of the battery 120*a* (Step S56) by a warning message or some other indication means if the expected suppliable time of the battery 120*a* is less than the estimated recording time. An example of the warning message may be, but is not limited to, "It is probably impossible to record all data using the currently remaining battery capacity. Nevertheless, do you still want to proceed with the recording?". After communicating the warning message to a user, e.g., via a display or audio means, the controller 150 waits for the user's response (Step S57).

At this time, if the user requests the recording to stop, the controller 150 then stops writing data to the disk 210 (recording medium) and conducts an operation to properly close or terminate the current data writing operation as in the aforementioned steps S30 to S32 if data writing was proceeding (Step S58), or ignores the request for data recording if data writing has not begun (Step S59).

Despite the above warning message, if the user still desires to proceed with the data recording operation at Step S57, then Steps S10 to S20 for checking the remaining battery capacity, Step S21 for adjusting the disk writing speed based on the remaining battery capacity, and Steps S22 to S32 for determining whether or not to stop writing and start closing the current writing operation, are conducted (Step S60) as in the embodiment of FIG. 2. Therefore, in the middle of the data writing operation, the disk writing operation can be properly closed even if the remaining battery capacity is low.

On the other hand, if it is determined at Step S55 that the expected suppliable time of the battery is not less than the estimated recording time, then the normal data writing operation is conducted or continued in Step 61, and the process ends.

The above-explained methods of controlling the disk writing operation according to the present invention can effectively prevent disk damages typically caused by abnormal or immature terminating of writing operations due to a complete discharge of a battery in a notebook, a portable disk drive, or other electronic device.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of controlling a disk writing operation based on a remaining electric power capacity of a battery in a data recording apparatus powered by the battery, the method comprising the steps of:

(a) detecting a currently remaining electric power capacity of the battery;

(b) comparing the detected remaining electric power capacity of the battery with a reference capacity needed for completing a data writing operation; and (c) conducting a data writing termination operation on a recording medium based on the comparison results, wherein the data writing termination operation includes a writing operation of writing termination management information on the recording medium, the termination management information pertaining to the data writing termination operation.

2. The method as set forth in claim 1, wherein the termination management information is written in a program memory area allocated on the recording medium.

3. The method as set forth in claim 1, wherein the termination management information includes at least one of the following:

first termination management information written in a lead-in area of the recording medium that is allocated before written data; and second termination management information written in a lead-out area of the recording medium that is allocated after the written data.

4. The method as set forth in claim 3, wherein the first termination management information includes information identifying a next writable point on the recording medium.

5. The method as set forth in claim 3, wherein the second termination management information includes program area ending marks identifying a point on the recording medium at which the data writing operation has been terminated.

6. The method as set forth in claim 1, wherein, in the conducting step (c), a data writing operation is conducted if said comparing step (b) indicates that the detected remaining electric power capacity of the battery is greater than the reference capacity, and the data writing termination operation is conducted if said comparing step (b) indicates that the detected remaining electric power capacity of the battery is not greater than the reference capacity.

7. The method as set forth in claim 1, further comprising:

(d) generating a message to a user regarding a status of the remaining electric power capacity of the battery based on the comparison results.

8. The method as set forth in claim 1, wherein the termination management information includes program area ending marks written behind a writing-terminated track on the recording medium.

9. The method as set forth in claim 8, wherein the termination management information further includes information identifying a next writable point on the recording medium.

\* \* \* \* \*